United States Patent [19]
Presley et al.

[11] 3,947,711
[45] Mar. 30, 1976

[54] MAGNETIC SPEED SENSOR

[75] Inventors: Rex Wallace Presley, Livonia; Jack Richardson Lorraine, Howell, both of Mich.

[73] Assignee: The Bendix Corporation, South Bend, Ind.

[22] Filed: June 13, 1974

[21] Appl. No.: 478,994

[52] U.S. Cl. ................................ 310/155; 310/168
[51] Int. Cl.² ........................................ H02K 21/38
[58] Field of Search ........... 310/152, 155, 156, 168; 340/199

[56] References Cited
UNITED STATES PATENTS

| | | |
|---|---|---|
| 3,509,390 | 4/1970 | Loughlin et al. .................. 310/67 X |
| 3,710,158 | 1/1973 | Bachle et al. ..................... 310/67 X |
| 3,739,204 | 6/1973 | Sugawara et al. .................. 310/15 X |
| 3,825,782 | 7/1974 | Dassler .............................. 310/168 |

*Primary Examiner*—Donovan F. Duggan
*Attorney, Agent, or Firm*—Ken C. Decker; S. H. Hartz

[57] ABSTRACT

A speed sensor for a vehicle wheel has a rotating tone wheel and a stationary E-shaped magnetic sensor having a sensing pole of square loop magnetic material positioned between two switching poles. A coil is wound on the sensing pole and the poles are magnetized to periodically reverse the flux in the sensing pole as the teeth on the tone wheel alternately pass the switching poles to induce a signal voltage in the coil corresponding to wheel speed and substantially free of noise components due to misalignment and vibrations of the tone wheel upon relative rotation of the tone wheel and magnetic sensor.

10 Claims, 5 Drawing Figures

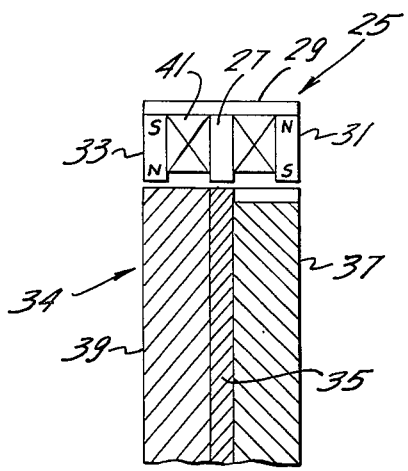
FIG.3
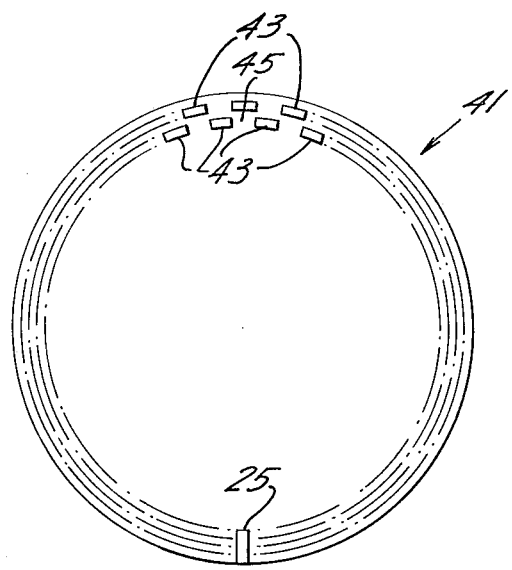
FIG.4
FIG.5
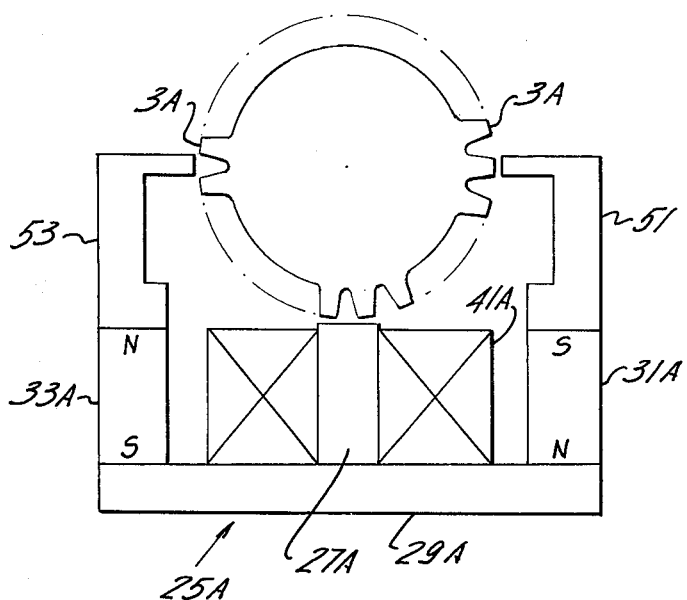

MAGNETIC SPEED SENSOR

The invention relates to adaptive braking systems for use on vehicles, such as automobiles or trucks, and more specifically to wheel speed sensors for providing the adaptive braking system with information relating to the speed and acceleration of the wheels. The invention can be used in the adaptive braking system described in U.S. Pat. No. 3,494,671 and may be applied to the wheel speed sensors described in U.S. Pat. Nos. 3,626,225; 3,626,226; 3,626,227; 3,626,228 and 3,629,635. All of the above patents are assigned to the same assignee as the present application.

The present invention reduces the effects of axial tone wheel misalignment and axial and radial tone wheel vibration. Axial tone wheel misalignment, such as run out or wobble, causes low frequency noise components in the speed signal and axial and radial tone wheel vibration cause high frequency noise components in the speed signal. In adaptive braking systems the speed signal is usually time differentiated to obtain an acceleration signal and this causes the noise components to reach excessive values. Of course, the low frequency noise components can be reduced to an acceptable level by close manufacturing tolerances and accurate alignment of the tone wheel, but the cost of this solution is much too high for automotive applications. The speed signal must be filtered to reduce the high frequency noise components.

The invention contemplates a speed sensor for a vehicle wheel comprising a tone wheel driven by the vehicle and subject to misalignment and vibration, the tone wheel being made of magnetic material and having a plurality of teeth, and sensing means having a pair of poles of magnetic material and a sensing pole of square loop magnetic material positioned between the first mentioned poles, the poles being positioned proximate the tone wheel teeth, coil means on the sensing pole, and means for magnetizing the poles to induce a signal voltage in the coil means corresponding to wheel speed and substantially free of noise components due to misalignment and vibration of the tone wheel upon relative rotation of the tone wheel and sensing means.

The present invention reduces the noise components to an acceptable level even when the tone wheel is warped and axially misaligned and subject to severe axial and radial vibrations by using a magnetic sensor having a sensing pole of square loop magnetic material. The solution to the problem using the invention is relatively inexpensive and more reliable and permits broad manufacturing tolerances.

BRIEF DESCRIPTION OF THE DRAWINGS

FIG. 3 is a sectional view of a second embodiment of the invention.

FIG. 4 is a schematic of a third embodiment of the invention, and

FIG. 5 is a schematic of a fourth embodiment of the invention.

DETAILED DESCRIPTION OF THE INVENTION

Figure 1:
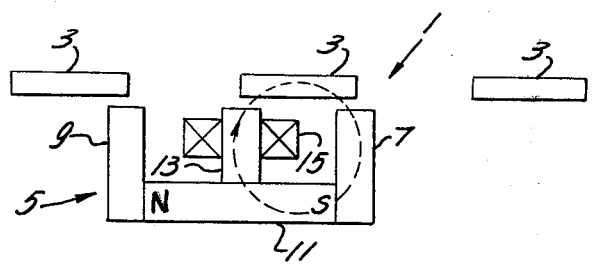
FIG. 1 is a schematic of one embodiment of a wheel speed sensor constructed according to the invention.

Referring to the drawings, the wheel speed sensor shown in FIG. 1 and constructed according to the invention includes a tone wheel 1 of magnetic material having a series of equally spaced teeth 3 about its periphery. The spaces between the teeth preferably are the same size as the teeth. The tone wheel may be secured to the vehicle wheel hub and may be of relatively large diameter or it may be frictionally driven and of relatively small diameter as described in the above patents. The friction drive may be operated by the wheel or drive shaft or in any other suitable manner.

A magnetic sensor 5 has a pair of switching poles 7 and 9 of magnetic material secured to a permanent magnet 11 at its ends and a sensing pole 13 secured to the permanent magnet at its center in E configuration. The poles are equally spaced from one another and their center to center spacing preferably is the width of one tooth 3. A coil 15 is wound on sensing pole 13.

Figure 2:
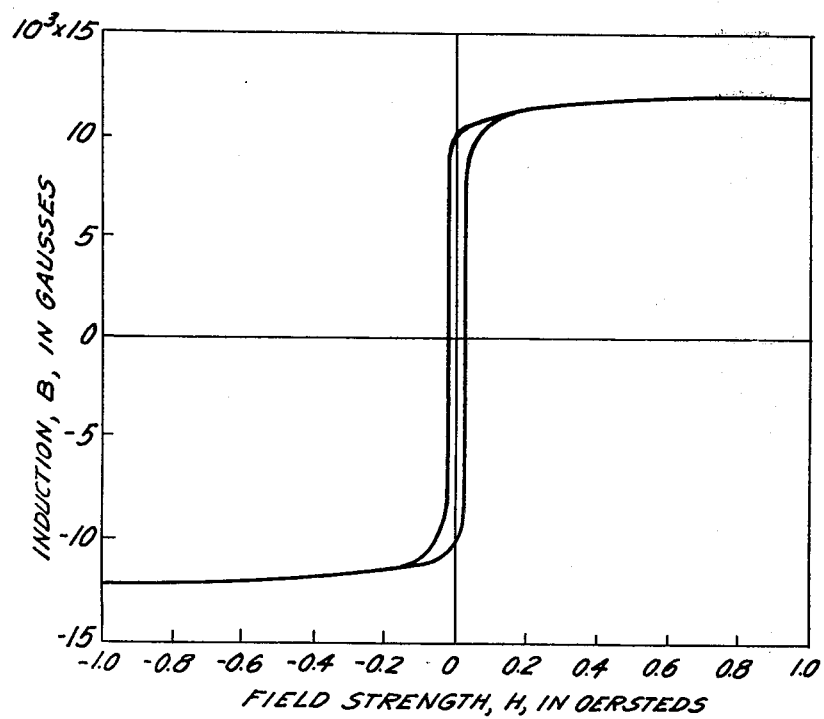
FIG. 2 shows a hysteresis curve for square loop magnetic material.

Pole 13 is made of square loop magnetic material which has a constant flux density of about 12,000 gauss. A hysteresis curve for square loop magnetic material is shown in FIG. 2. It is apparent from the curve that a small change in field strength near zero abruptly reverses the direction of flux in the material.

The magnetic sensor is mounted on a stationary part of the vehicle with poles 7, 9 and 13 positioned radially at tooth centers proximate the tone wheel. As the tone wheel rotates, when a tooth 3 is positioned opposite poles 7 and 13, a space between two teeth is positioned opposite poles 9 and 13 as shown in FIG. 1. When the tone wheel is in this position, flux flows in the direction of the arrow from the magnet through sensing pole 13, adjacent tooth 3 and pole 7 to the south pole of the magnet. When the tone wheel rotates through a distance equal to one tooth to a position where a tooth is between sensing pole 13 and pole 9, the magnetic flux flows from the north pole of magnet 11 through pole 9, adjacent tooth 3 and sensing pole 13. The flux abruptly reverses direction through sensing pole 13 and generates a pules in sensing coil 15. The flux in sensing pole 13 reverses direction each time a tone wheel tooth moves across the sensor and the sensing pole is magnetically saturated between pulses because of the properties of square loop material. The speed signal voltage has a relatively large amplitude because of the high flux density in the sensing pole at the time of reversal. Axial and radial movement of the tone wheel, such as occurs due to vibration or misalignment, does not change the flux density or flux direction in sensing pole 13 and induces no noise component in the sensing coil.

FIG. 3 shows a second embodiment of the invention in which the magnetic sensor 25 is positioned adjacent the circumference of tone wheel 34. The tone wheel comprises a pair of gears or toothed members 37, 39 secured to opposing faces of a disk 35. The gears have the same number of teeth and are staggered relative to one another with a tooth of one gear adjacent a space between two teeth in the other gear.

Magnetic sensor 25 has a sensing pole 27 of square loop magnetic material secured to a member 29 of magnetic material at its center. Permanent magnets 31 and 33 form the switching poles and the north pole of magnet 31 and the south pole of magnet 33 are secured to the opposite ends of member 29 in E-shaped configuration. A coil 41 is wound on sensing pole 27.

Magnetic sensor 25 is positioned with sensing pole 27 aligned with disk 35 and with magnets 31 and 33 aligned with gears 37 and 39, respectively. The device operates in the same manner as the embodiment shown in FIG. 1. When a tooth on gear 39 is adjacent magnet 33 flux flows from the north pole of magnet 33 through the adjacent gear tooth, disk 35, sensing pole 27 and member 29 to the south pole of magnet 33. When the tone wheel rotates to a position in which a tooth of gear 37 is adjacent magnet 31 flux flows from the north pole of magnet 31 through member 29, sensing pole 27, disk 35 and the adjacent tooth of gear 37 to the South pole of magnet 31. The flux reverses direction in sensing pole 37 and induces a voltage pulse in coil 41. Because sensing pole 33 is made of square loop magnetic material the sensing pole is magnetically saturated between pulses and immune to most noise components, and the speed signal voltage has a relatively large amplitude because of the high flux density in the sensing pole at the time of reversal.

FIG. 4 shows another embodiment of the invention in which the tone wheel 41 has two concentric rows of slots 43 near its circumference. The rows of slots are separated by a continuous portion 45 therebetween. The slots are staggered with a slot in one row adjacent the bridge between the slots in the other row. A magnetic sensor 25, similar to that shown in FIG. 3, is positioned radially at the side of the tone wheel with one of the magnets 31 aligned with one row of slots 43 and the other magnet 33 aligned with the second row of slots and the sensing pole 27 aligned with the continuous portion 45 between the rows of slots. As the tone wheel rotates the flux in the sensing pole reverses direction each time a bridge between the slots moves across the sensor as described in connection with the embodiment of FIG. 3. Continuous portion 45 performs the same function as disk 35 in FIG. 3 and is part of the return path for flux from magnets 31 and 33.

FIG. 5 shows another embodiment of the invention in which a small tone wheel 1 may be driven by friction contact with a drum rotating with the wheel as described in the above patents. The magnetic sensor 25A is similar to the magnetic sensor shown in FIG. 3. Corresponding parts of the magnetic sensor in FIG. 5 are designated by the same numeral as in FIG. 3 with the suffix "A." The magnetic sensor of FIG. 5 differs from the magnetic sensor of FIG. 3 in that switching poles 51 and 53 are attached to the ends of permanent magnets 31A and 33A, respectively. The tone wheel is positioned between switching poles 51 and 53 and the teeth 3A on the tone wheel are arranged so that when a tooth is in registry with switching pole 51 switching pole 53 is adjacent a space between two teeth and sensing pole 27A is adjacent at least one tooth. Likewise, when a tooth is in registry with switching pole 53 switching pole 51 is adjacent a space between two teeth and sensing pole 27A is adjacent at least one tooth. Switching poles 51 and 53 ae shaped so that the ends of the poles proximate the teeth are approximately as wide as the teeth.

In the embodiment shown, switching poles 51 and 53 are separated by 180° and the sensing pole is positioned 90° from each of the switching poles. However, any other suitable angle between the poles may be used as long as the switching poles and sensing pole are positioned relative to the tone wheel teeth as described above.

As the tone wheel rotates the flux in the sensing pole reverses direction each time a tooth moves across a switching pole as described in connection with the embodiment of FIG. 3.

In the arrangements described the speed signal voltage has a relatively large amplitude because of the high flux density in the sensing pole at the time of reversal of the flux, and axial and radial movement of the tone wheel, such as occurs due to vibration or misalignment, does not changge the flux density or flux direction in the sensing pole and induces no noise components in the sensing coil.

What is claimed is:

1. A speed sensor for a vehicle wheel comprising a tone wheel driven by the vehicle and subject to misalignment and vibration, the tone wheel being made of magnetic material and having a plurality of teeth, and sensing means having a pair of switching poles of magnetic material and a sensing pole of square loop magnetic material positioned between the switching poles, the poles being positioned proximate the tone wheel teeth, coil means on the sensing pole, and means for magnetizing the poles to induce a signal voltage in the coil means corresponding to wheel speed and substantially free of noise components due to misalignment and vibration of the tone wheel upon relative rotation of the tone wheel and sensing means.

2. A speed sensor as described in claim 1 in which the teeth on the tone wheel are arranged to alternately pass the switching poles to periodically reverse the direction of flux in the sensing pole to induce the signal voltage in the coil means.

3. A speed sensor as described in claim 1 in which the means for magnetizing the poles is a permanent magnet.

4. A speed sensor as described in claim 3 in which the switching poles are secured to the ends of the permanent magnet and the sensing pole is secured to the permanent magnet at its center in E-shaped configuration.

5. A speed sensor as described in claim 1 in which the switching poles are formed by permanent magnets and are secured with the sensing pole in E-shaped configuration to a member of magnetic material.

6. A speed sensor as described in claim 5 in which the north and south poles of the magnets are oppositely disposed.

7. A speed sensor as described in claim 1 in which the teeth on the tone wheel and the spaces therebetween are the same size and the distance between the sensing pole and each of the switching poles is substantially the length of one tooth.

8. A speed sensor as described in claim 1 in which the tone wheel comprises a pair of toothed members separated by a disk-like member therebetween and the magnetic sensor is positioned adjacent the circumference of the tone wheel with the switching poles adjacent the toothed wheels and the sensing pole adjacent the disk-like member.

9. A speed sensor as described in claim 1 in which the teeth on the tone wheel are formed near the circumference of the tone wheel by two concentric rows of slots separated by a continuous portion therebetween, the slots in one row being staggered relative to the slots in the other row with a slot in one row adjacent the bridge between the slots in the other row, and the magnetic sensor being positioned radially at the side of the tone wheel with each switching pole aligned with a row of slots and the sensing pole aligned with the continuous portion between the rows of slots.

10. A speed sensor as described in claim 1 in which the switching poles are formed of magnetic material attached to permanent magnets secured with the sensing pole in E-shaped configuration to a member of magnetic material.

* * * * *